United States Patent
Rouse et al.

(10) Patent No.: US 11,287,506 B2
(45) Date of Patent: Mar. 29, 2022

(54) DIRECTIONAL INFRASOUND SENSING

(71) Applicant: National Technology & Engineering Solutions of Sandia, LLC, Albuquerque, NM (US)

(72) Inventors: Jerry W. Rouse, Albuquerque, NM (US); Daniel Bowman, Albuquerque, NM (US); Timothy Walsh, West Lafayette, IN (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 21 days.

(21) Appl. No.: 16/893,675

(22) Filed: Jun. 5, 2020

(65) Prior Publication Data
US 2021/0382130 A1    Dec. 9, 2021

(51) Int. Cl.
*G01S 3/80* (2006.01)
*G01S 3/801* (2006.01)
*G01S 3/803* (2006.01)

(52) U.S. Cl.
CPC ........... *G01S 3/8006* (2013.01); *G01S 3/801* (2013.01); *G01S 3/8034* (2013.01)

(58) Field of Classification Search
CPC ....... G01S 3/8006; G01S 3/8034; G01S 3/801
USPC ...................................................... 367/129
See application file for complete search history.

(56) References Cited

U.S. PATENT DOCUMENTS 3,018,840 A *  1/1962  Bourne ................ E04B 1/86
                                                181/224
8,620,672 B2 * 12/2013  Visser ................. H04R 3/005
                                                704/500
9,494,477 B2 * 11/2016  Wiesbauer ........... G01L 9/0073

OTHER PUBLICATIONS

Zhu, X. et al., "Deep-Subwavelength-Scale Directional Sensing Based on Highly Localized Dipolar Mie Resonances", Physical Review Applied vol. 5 (2016), pp. 054015-1-054015-8.

De Bree, H-E. et al., "Detection, localization and tracking of aircraft using acoustic vector sensors", Inter-noise 2011, Osaka, Japan, 5 pages.

Song, G.Y. et al., "Broadband fractal acoustic metamaterials for low-frequency sound attenuation", Applied Physics Letters, vol. 109 (2016), pp. 131901-1-131901-5.

* cited by examiner

*Primary Examiner* — Daniel L Murphy
(74) *Attorney, Agent, or Firm* — Yee & Associates, P.C.

(57) ABSTRACT

A method and apparatus for determining a direction of infrasound. Infrasound is received by a directional infrasound sensor comprising a plurality of channels and a plurality of sensor devices. Each channel in the plurality of channels comprises a single opening at a first end of the channel and a closed end opposite the opening. The opening of each channel in the plurality of channels is pointed in a different direction from the opening of each other channel in the plurality of channels. The plurality of sensor devices includes a sensor device at the closed end of each channel in the plurality of channels. Each sensor device in the plurality of sensor devices is configured to generate a sensor signal in response to pressure. The sensor signals generated by the plurality of sensor devices are processed to determine the direction of the infrasound received by the directional infrasound sensor.

20 Claims, 9 Drawing Sheets

DIRECTIONAL INFRASOUND SENSING

GOVERNMENT LICENSE RIGHTS

This invention was made with Government support under Contract No. DE-NA0003525 awarded by the United States Department of Energy/National Nuclear Security Administration. The U.S. Government has certain rights in the invention.

BACKGROUND INFORMATION

1. Field

The present disclosure relates generally to detecting infrasound. More particularly, illustrative embodiments are directed to a directional infrasound sensor and method for determining the direction of arrival of detected infrasound.

2. Background

Infrasound refers to sound waves with frequencies below the human hearing threshold. Generally, infrasound refers to sound waves with frequencies below approximately 20 Hz. Infrasound also may be referred to as low-frequency sound. Infrasound is characterized by an ability to get around obstacles with relatively little modification and to travel relatively great distances in comparison to sound waves with higher frequencies.

Infrasound may be generated by both natural and anthropogenic phenomena. For example, without limitation, infrasound may be generated by natural phenomena such as volcanic eruptions, earthquakes, bolides, severe storms, and other natural events. Infrasound may be generated by human activity such as, without limitation, the flight of supersonic aircraft, rocket launches, nuclear and chemical explosions, and other man-made events. Infrasound provides an indication of the occurrence of such natural and anthropogenic events that may be detected and analyzed.

Infrasound may be detected by infrasound pressure sensors deployed in monitoring networks. Infrasound monitoring networks may range from networks including relatively few stations that are deployed for days or weeks up to networks including stations with global coverage that may be deployed for years at a time. The International Monitoring System is an example of a current system that includes a network of infrasound monitoring stations including pressure sensors for detecting infrasound along with other sensors for detecting nuclear explosions to provide verification under the Comprehensive Nuclear-Test-Ban Treaty. The infrasound sensors in the International Monitoring System have detected sound waves from nuclear tests, volcanic eruptions, interacting ocean waves, bolides, and other events.

Pressure sensors detect infrasound by measuring air pressure, which is a scalar. Therefore, a single pressure sensor cannot determine the direction of arrival of an acoustic wave. To determine the direction of infrasound using current pressure sensors, an array of pressure sensors may be deployed in an area extending from tens to thousands of meters across. Array processing techniques may be used to process the information provided by the pressure sensors in the array to detect and characterize coherent infrasound waves. Vector based infrasound sensors that rely on particle velocity measurements have been investigated, but have not found widespread use.

Noise is another issue faced by infrasound detecting technologies. Incoherent pressure fluctuations created by wind are a dominant source of noise for infrasound detection. These fluctuations are often of much higher amplitude than the relatively faint infrasound waves of interest. Mechanisms such as pipe rosettes, soaker hoses, porous domes, and even piles of gravel are currently used to reduce wind noise in infrasound detection.

Therefore, it may be desirable to have a method and apparatus that take into account at least some of the issues discussed above, as well as other possible issues.

SUMMARY

Illustrative embodiments provide a directional infrasound sensor comprising a plurality of channels and a plurality of sensor devices. Each of the plurality of channels comprises a single opening at a first end of the channel and a closed end opposite the opening. The opening of each channel in the plurality of channels is pointed in a different direction from the opening of each other channel in the plurality of channels. The plurality of sensor devices includes a sensor device at the closed end of each channel in the plurality of channels. Each sensor device in the plurality of sensor devices is configured to generate a sensor signal in response to pressure.

Other illustrative embodiments provide a directional infrasound sensor comprising a first directional infrasound sensor and a second directional infrasound sensor stacked with the first directional infrasound sensor. The first directional infrasound sensor comprises a first plurality of channels and a first plurality of sensor devices. Each channel in the first plurality of channels comprises a single opening at a first end of the channel and a closed end opposite the opening. The opening of each channel in the first plurality of channels is pointed in a different direction from the opening of each other channel in the first plurality of channels. The first plurality of sensor devices includes a sensor device at the closed end of each channel in the first plurality of channels. Each sensor device in the first plurality of sensor devices is configured to generate a sensor signal in response to pressure. The second directional infrasound sensor comprises a second plurality of channels and a second plurality of sensor devices. The second plurality of channels are different from the first plurality of channels. Each channel in the second plurality of channels comprises a single opening at a first end of the channel and a closed end opposite the opening. The opening of each channel in the second plurality of channels is pointed in a different direction from the opening of each other channel in the second plurality of channels. The second plurality of sensor devices includes a sensor device at the closed end of each channel in the second plurality of channels. Each sensor device in the second plurality of sensor devices is configured to generate a sensor signal in response to pressure.

Illustrative embodiments also provide a method of determining a direction of infrasound. The infrasound is received by a directional infrasound sensor comprising a plurality of channels and a plurality of sensor devices. Each channel in the plurality of channels comprises a single opening at a first end of the channel and a closed end opposite the opening. The opening of each channel in the plurality of channels is pointed in a different direction from the opening of each other channel in the plurality of channels. The plurality of sensor devices includes a sensor device at the closed end of each channel in the plurality of channels. Each sensor device in the plurality of sensor devices is configured to generate a sensor signal in response to pressure. The sensor signals generated by the plurality of sensor devices are processed to determine the direction of the infrasound received by the directional infrasound sensor.

The features and functions may be achieved independently in various embodiments of the present disclosure or may be combined in yet other embodiments in which further details may be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

Illustrative embodiments recognize and take into account various considerations. For example, the illustrative embodiments recognize and take into account that the current lack of a single-sensor direction of arrival unit for infrasound sensing is an issue for locations with limited deployment space or stringent environmental regulations, such as small islands or urban areas. Current systems and methods for directional infrasound sensing using distributed arrays of many sensors also may not be employed effectively in remote areas where power and maintenance is a concern.

While pressure sensors on high altitude balloons have proven effective at detecting infrasound at long ranges, it is impossible to deploy a static array on such a platform. There is a pressure sensor on the InSight lander currently deployed on Mars, but it also cannot determine direction of arrival since it is a single unit. Neither high altitude balloon deployments nor missions to other planets can rely on current methods that use multiple detectors for directional infrasound sensing.

Illustrative embodiments also recognize and take into account that current solutions for reducing wind noise in infrasound detection are not able to eliminate the problem entirely. For example, the International Monitoring System uses pipe rosettes and multiple sensors to reduce wind and extract coherent infrasound signals. However, even these stations suffer from high noise levels depending on the season and time of day.

Illustrative embodiments provide a single-unit infrasound sensor that uses acoustic metamaterials to capture the direction of arrival of an incoming wave. This unit eschews the traditional scalar pressure measurement, instead yielding a vector result. It may also permit the separation of wind-generated pressure fluctuations from incoming acoustic waves.

A directional infrasound sensor in accordance with an illustrative embodiment includes a number of independent channels with a range of effective lengths and opening locations. A unique relationship among the pressure amplitude at the bottom of the channels for a given direction of arrival is achieved through proper choice of channel length and opening location. Directional infrasound sensing in accordance with an illustrative embodiment will be particularly useful in locations where large array-based deployments are infeasible, such as cities, remote areas, and environmentally sensitive regions. Suitably scaled versions may also permit directional sensing on other planetary bodies.

Figure 1:
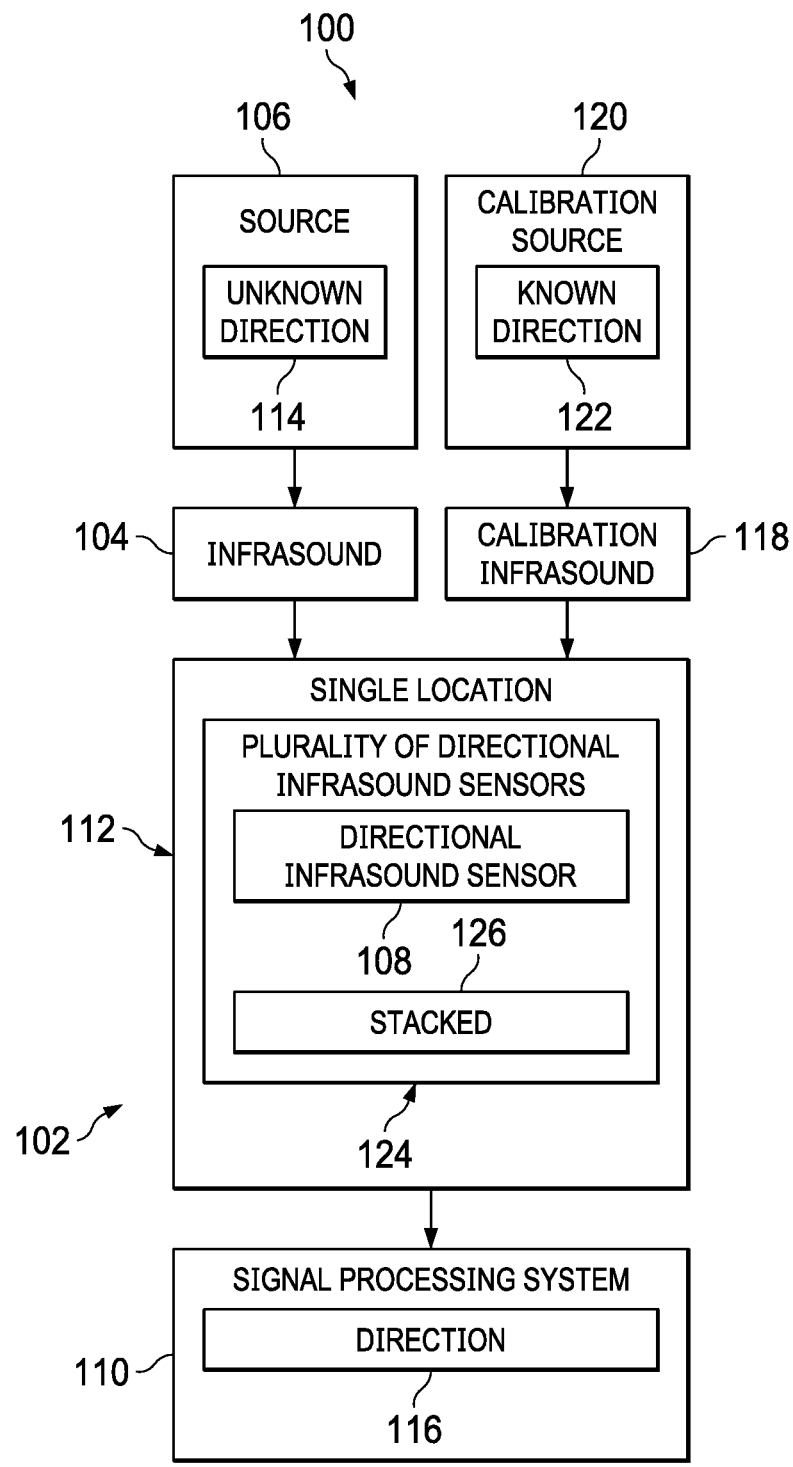
FIG. 1 is an illustration of a block diagram of a directional infrasound sensing environment in accordance with an illustrative embodiment.

With reference now to the figures and, in particular, with reference to FIG. 1, an illustration of a block diagram of directional infrasound sensing environment 100 is depicted in accordance with an illustrative embodiment. Directional infrasound sensing environment 100 may include any appropriate environment on Earth or off Earth. In accordance with an illustrative embodiment, directional infrasound sensing system 102 is configured to sense infrasound 104 in directional infrasound sensing environment 100. Infrasound 104 may be generated by any appropriate source 106 in directional infrasound sensing environment 100. For example, source 104 may be a natural or human-made source of infrasound 104.

Directional infrasound sensing system 102 includes directional infrasound sensor 108 and signal processing system 110. Directional infrasound sensor 108 is located at single location 112 in directional infrasound sensing environment 100. In accordance with an illustrative embodiment, directional infrasound sensor 108 includes multiple channels opening in different directions. Directional infrasound sensor 108 is configured to receive infrasound 104 from source 106 in unknown direction 114 from directional infrasound sensor 108. Signal processing system 110 is configured to process sensor signals generated by directional infrasound sensor 108 in response to receiving infrasound 104 from source 106 to determine direction 116 of arrival of infrasound 104 at directional infrasound sensor 108 and thus direction 116 of source 106 of infrasound 104 from directional infrasound sensor 108. Signal processing system 110 may be in the same location 112 as directional infrasound sensor 108 or may be located remotely from directional infrasound sensor 108.

Directional infrasound sensor 108 also may receive calibration infrasound 118 from calibration source 120 in known direction 122 from directional infrasound sensor 108. Calibration source 120 may include any appropriate method, system, or device for generating calibration infrasound 118. In this example, signal processing system 110 is configured to process sensor signals generated by directional infrasound sensor 108 in response to receiving calibration infrasound 118 from known direction 122 to calibrate the algorithm that is used by signal processing system 110 to determine direction 116 of arrival of infrasound 104 from unknown direction 114.

In accordance with an alternative embodiment, directional infrasound sensing system 102 may include plurality of directional infrasound sensors 124 at single location 112 in directional infrasound sensing environment 100. Any appropriate number of directional infrasound sensors in accordance with an illustrative embodiment may be included in plurality of directional infrasound sensors 124. Each directional infrasound sensor 108 in plurality of directional infrasound sensors 124 includes multiple channels opening in different directions and may be configured or tuned to receive and sense different frequency ranges of infrasound 104 from other directional infrasound sensors in plurality of directional infrasound sensors 124.

For example, without limitation, plurality of directional infrasound sensors 124 may be stacked 126 together, one on top of another, at single location 112. Alternatively, plurality of directional infrasound sensors 124 may be arranged in any other appropriate arrangement at single location 112.

Figure 2:
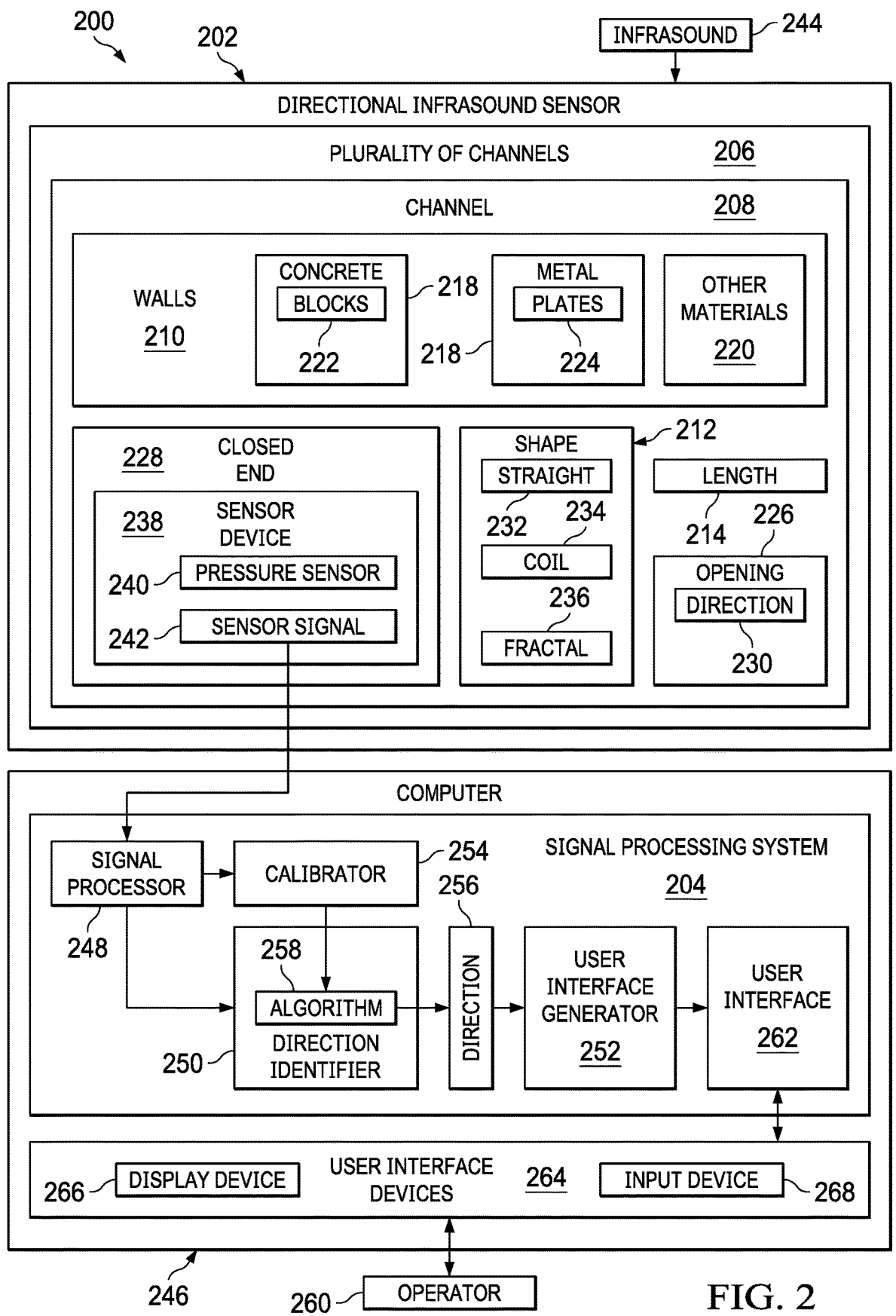
FIG. 2 is an illustration of a block diagram of a directional infrasound sensing system in accordance with an illustrative embodiment.

Turning to FIG. 2, an illustration of a block diagram of a directional infrasound sensing system is depicted in accordance with an illustrative embodiment. Directional infrasound sensing system 200 is an example of one implementation of directional infrasound sensing system 102 in FIG. 1. Directional infrasound sensing system 200 includes directional infrasound sensor 202 and signal processing system 204.

Directional infrasound sensor 202 includes plurality of channels 206. Plurality of channels 206 may include any appropriate number of channels. For example, without limitation, plurality of channels 206 may include four channels or another appropriate number of channels.

Each channel 208 in plurality of channels 206 is formed by walls 210 that define shape 212 and length 214 of channel 208. Walls 210 may be formed in any appropriate manner using any appropriate material for infrasound sensing. For example, without limitation, walls 210 forming channel 208 may be made of concrete 216, metal 218, other material 220, or any appropriate combination of materials. For example, walls 210 may be formed of blocks 222 of concrete 216, plates 224 of steel or other appropriate metal 218, or a combination of blocks 222 of concrete 216 and plates 224 of metal 218.

Each channel 208 in plurality of channels 206 includes opening 226 at one end of channel 208 and closed end 228 at another end of channel 208 opposite opening 226. Channel 208 is preferably substantially enclosed by walls 210 along length 214 of channel 208 between opening 226 and closed end 228.

Opening 226 for channel 208 points in direction 230 from directional infrasound sensor 202. Direction 230 of opening 226 may be defined as the direction pointing outward from channel 208 along the direction of the axis of channel 208 at opening 226. Alternatively, direction 230 of opening 226 may be defined as the direction pointing outward from channel 208 that is perpendicular to the plane of opening 226.

Opening 226 for each channel 208 in plurality of channels 206 preferably points in a different direction 230 from opening 226 of each other channel 208 in plurality of channels 206. For example, without limitation, opening 226 for a first channel 208 in plurality of channels 206 may point in a first direction, opening 226 for a second channel 208 in plurality of channels 206 may point in a second direction that is opposite to the first direction, opening 226 for a third channel 208 in plurality of channels 206 may point in a third direction that is perpendicular to the first direction and the second direction, and opening 226 for a fourth channel 208 in plurality of channels 206 may point in a fourth direction that is opposite to the third direction.

Size and shape 212 of the cross section of channel 208 in the plane perpendicular to the axis of channel 208 is preferable substantially the same along length 214 of channel 208. Otherwise, shape 212 and length 214 of channel 208 may be any appropriate shape and length for infrasound sensing. For example, without limitation, shape 212 of channel 208 along length 214 of channel 208 between opening 226 and closed end 228 of channel 208 may be straight 232, coil 234, fractal 236, or any other appropriate shape. Shape 212 of channel 208 in plurality of channels 206 may be the same as or different from the shape of other channels in plurality of channels 206. Length 214 of channel 208 in plurality of channels 206 may be the same as or different from the length of other channels in plurality of channels 206.

For example, without limitation, the overall size of directional infrasound sensor 202 including plurality of channels 206 in accordance with an illustrative embodiment may be approximately 0.2 to 1 meter vertically by approximately 4 to 6 meters across horizontally.

Sensor device 238 is positioned at closed end 228 of each channel 208 in plurality of channels 206. In the present application, including in the claims, unless explicitly stated otherwise, a sensor device is located at the closed end of a channel if the sensor device is located on the closed end of the channel, adjacent to the closed end of the channel, or in the channel and closer to the closed end of the channel than to the opening of the channel. Sensor device 238 may be pressure sensor 240 or any other appropriate sensor that generates sensor signal 242 in response to infrasound 244 received by directional infrasound sensor 202.

Signal processing system 204 is configured to receive and process sensor signal 242 from sensor device 238 for each channel 208 in plurality of channels 206 in directional infrasound sensor 202. The functionality of signal processing system 204 as described herein may be implemented in any appropriate manner. For example, without limitation, signal processing system 204 may be implemented in software running on computer 246 or any other appropriate programmable device or system. Alternatively, signal processing system 204 may be implemented in hardware or in hardware devices in combination with software running on computer 246.

Signal processing system 204 may be at the same location as directional infrasound sensor 202 or at a location that is remote from directional infrasound sensor 202. Sensor signal 242 may be provided from directional infrasound sensor 202 to signal processing system 204 in any appropriate form and via any appropriate communications media and method.

Signal processing system 204 comprises signal processor 248, direction identifier 250, user interface generator 252, and calibrator 254. Signal processor 248 is configured to receive and process sensor signal 242 from sensor device 238 for each channel 208 in plurality of channels 206 in directional infrasound sensor 202 into processed sensor signal data in an appropriate form for use by direction identifier 250 and calibrator 254.

Direction identifier 250 is configured to use the processed sensor signal data from plurality of channels 206 in directional infrasound sensor 202 to determine direction 256 of infrasound 244 received by directional infrasound sensor 202. Direction 256 of infrasound 244 may be the direction of arrival of infrasound 244 at directional infrasound sensor 202. Direction 256 of infrasound 244 thus indicates the direction from directional infrasound sensor 202 of the source of infrasound 244. Direction identifier 250 may be configured to determine direction 256 of infrasound 244 received by directional infrasound sensor 202 using any appropriate algorithm 258.

User interface generator 252 is configured to present direction 256 of infrasound 244, as determined by direction identifier 250, to operator 260 on user interface 262. For example, without limitation, operator 260 may be a human operator of directional infrasound sensing system 200. User interface generator 252 may be configured to display or otherwise present direction 256 to operator 260 on user interface 262 in any appropriate manner. For example, without limitation, user interface 262 may be a graphical user interface on which the determined direction 256 of infrasound 244 received by directional infrasound sensor 202 is displayed graphically. Operator 260 may interact with user interface 262 via any appropriate user interface devices 264, including any appropriate display device 266 and any appropriate input device 268.

Calibrator 254 is configured to use the processed sensor signal data from plurality of channels 206 in directional infrasound sensor 202 as generated in response to receiving infrasound 244 by directional infrasound sensor 202 from a known direction to calibrate algorithm 258 that is used by direction identifier 250 to determine direction 256 of infrasound 244 received by directional infrasound sensor 202 from an unknown direction. For example, without limitation, calibrator 254 may be configured to identify characteristics of sensor signal 242 generated by sensor device 238 in each channel 208 in plurality of channels 206 in directional infrasound sensor 202 in response to infrasound 244 received by directional infrasound sensor 202 from various known directions. In this example, algorithm 258 may be configured to determine direction 256 of infrasound 244 received by directional infrasound sensor 202 from an unknown direction by comparing characteristics of sensor signal 242 generated by sensor device 238 in each channel 208 in plurality of channels 206 in directional infrasound sensor 202 in response to infrasound 244 received by directional infrasound sensor 202 from the unknown direction to the characteristics of sensor signal 242 generated by sensor device 238 in each channel 208 in plurality of channels 206 in directional infrasound sensor 202 in response to infrasound 244 received by directional infrasound sensor 202 from the various known directions as identified by calibrator 254.

The illustration of directional infrasound sensing system 200 in FIG. 2 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

For example, in an alternative embodiment, channel 208 in directional infrasound sensor 202 may have only one opening 226 and more than one closed end 228. In this example, channel 208 may have more than one sensor device 238 therein, with one sensor device at each of the more than one closed end 228 of channel 208.

An example of the derivation of the governing equation of a subwavelength-scale directional infrasound sensor in accordance with an illustrative embodiment is now presented. Illustrative embodiments are not limited to the specific example presented.

The sensor is assumed to have $N_c$ channels or grooves each closed at one end, inside the sensor, with only one opening to the surrounding fluid. Each channel has an effective length $L_n$, an opening width $\theta_o$ expressed in radians, and a location $\theta_n$ on the exterior surface of the sensor. These parameters are shown, for example, with reference to directional infrasound sensor 300 in FIG. 3.

The general expression for the complex acoustic pressure at location x due to a plane wave propagating along the direction described by the unit vector $\hat{n}$ with radian frequency $\omega = 2\pi f$, where f is frequency in Hz is expressed $$p(\vec{x}, \hat{n}, t) = e^{i(\omega t - k\hat{n} \cdot \vec{x})}, \tag{1}$$

where $k = \omega/c$ is the wavenumber [1/m]. Let the normal to the incident plane wave be directed along the radial direction from the origin at angle $\theta_{inc}$ relative to the x-axis:

$$\hat{n}(\theta_{inc}) = -\cos(\theta_{inc})\hat{e}_x - \sin(\theta_{inc})\hat{e}_y \tag{2}$$

where propagation along the x-axis from positive x to negative x is represented by $\theta_{inc} = 0$. Let the location x be expressed in polar coordinates $$\vec{x}(r, \theta) = r\cos(\theta)\hat{e}_x + r\sin(\theta)\hat{e}_y \tag{3}$$

Substitution of Eqs. (2) and (3) into Eq. (1) gives $$p_{inc}(r, \theta, \theta_{inc}) = e^{i(\omega t + kr\cos(\theta - \theta_{inc}))}, \tag{4}$$

where the following identity was used:

$$\cos(\theta)\cos(\theta_{inc}) + \sin(\theta)\sin(\theta_{inc}) = \cos(\theta - \theta_{inc}). \tag{5}$$

It is required that Eq. (4) be expressed in a Bessel function representation. This is accomplished using two relations:

$$\cos(z\cos(\theta)) = J_0(z) + 2\sum_{m=1}^{\infty} (-1)^m J_{2m}(z)\cos(2m\theta) \tag{6}$$

$$\sin(z\cos(\theta)) = 2\sum_{m=0}^{\infty} J_{2m+1}(z)\cos((2m+1)\theta). \tag{7}$$

Therefore $$e^{ikr\cos(\theta - \theta_{inc})} = J_0(kr) + 2\sum_{m=1}^{\infty} i^m J_m(kr)\cos(m(\theta - \theta_{inc})). \tag{8}$$

In order to simplify the analysis, this result is expressed in the form of a Fourier series with complex coefficients:

$$\sum_{m=-\infty}^{\infty} C_m J_m(kr) e^{im(\theta-\theta_{inc})}. \qquad (9)$$

Using the relation $$J_{-m}(z) = (-1)^m J_m(x) \qquad (10)$$

it is shown that Eq. (8) can be expressed $$e^{ikr\cos(\theta-\theta_{inc})} = \sum_{m=-\infty}^{\infty} i^m J_m(kr) e^{im(\theta-\theta_{inc})}. \qquad (11)$$

The sine function within the complex exponential is cancelled by complementary m values. For example, summation of the m=−2 and m=2 terms gives:

$$i^{-2}(-1)^2 J_2(kr)[\cos(2\alpha) - i\sin(2\alpha)] + i^2 J_2(kr)[\cos(2\alpha) + i\sin(2\alpha)] = -2 J_2(kr)\cos(2\alpha). \qquad (12)$$

Thus, truncation of the infinite series must include all complementary values:

$$\sum_{m=-\infty}^{\infty} \approx \sum_{m=-M}^{M}. \qquad (13)$$

Combining the above, the expression for the complex pressure at any point (r, θ) due to an incident plane wave propagating along the radial direction $\theta_{inc}$ is:

$$p_{inc}(r, \theta, \theta_{inc}) = e^{i\omega t} \sum_{m=-\infty}^{\infty} i^m J_m(kr) e^{im(\theta-\theta_{inc})}. \qquad (14)$$

The channels in the sensor are modeled as one-dimensional ducts of length L. For the field within the duct to remain one-dimensional, the diameter of the duct d<1.84c/(πf) (at 20 Hz d<10 m). The expression for the pressure and particle velocity in the duct will now be derived. The general solution of the one-dimensional wave equation for the time-harmonic acoustic pressure inside the duct is expressed:

$$p(x,t) = A e^{i(\omega t - kx)} + B e^{i(\omega t + kx)}. \qquad (15)$$

Using the linearized momentum equation $$\rho \frac{\partial u_x}{\partial t} = -\frac{\partial p}{\partial x}, \qquad (16)$$

where ρ [kg/m³] is the fluid density, the x-component of acoustic component of particle velocity is:

$$u_x(x, t) = \frac{1}{\rho c}(A e^{i(\omega t - kx)} - B e^{i(\omega t + kx)}), \qquad (17)$$

where c [m/s] is the speed of sound in the fluid.

At the closed end of the channel the particle velocity must be zero. Applying this boundary condition finds A=B. Using the exponential relation for the cosine function $$\frac{e^{-ikx} + e^{ikx}}{2} = \cos(kx) \qquad (18)$$

$$p(x, t) = A\cos(kx) e^{i\omega t} \qquad (19)$$

$$u_x(x, t) = \frac{-iA}{\rho c} \sin(kx) e^{i\omega t} \qquad (20)$$

The pressure at the closed end of the channel x=0 has complex amplitude A, and therefore root-mean-square value A/2. This coefficient will be determined using the pressure at the opening to the channel: A cos(kL).

The total acoustic pressure at any location (r, θ) for r≥$R_a$ can be expressed as a sum of the pressure due to the incident plane wave and the scattering caused by the presence of the sensor $$p_{tot}(r,\theta,t) = p_{inc}(r,\theta,t) + p_{scat}(r,\theta,t) \qquad (21)$$

In general, for time-harmonic pressure ($e^{i\omega t}$ has been removed but is implied):

$$p_{tot}(r, \theta) = \sum_{m=-\infty}^{\infty} [A_m^{(2)} H_m^{(2)}(kr) + A_m^{(1)} H_m^{(1)}(kr)] e^{im\theta} \qquad (22)$$

where $$H_m^{(1)}(z) = J_m(z) + i Y_m(z) \qquad (23)$$

$$H_m^{(2)}(z) = J_m(z) + i Y_m(z) \qquad (24)$$

are the Hankel functions (Bessel functions of the third kind). $H_m^{(2)}$ represents outgoing waves and $H_m^{(1)}$ represents incoming waves. The scattering is composed of only outgoing waves. Therefore, in general:

$$p_{scat}(r, \theta) = \sum_{m=-\infty}^{\infty} B_m H_m^{(2)}(kr) e^{im\theta}. \qquad (25)$$

The total pressure is known only on the surface of the sensor at the opening of the channels, given by Eq. (19), and technically only in the center of the channel opening. The scattering pressure is unknown. However, $B_m$ can be determined from the total radial particle velocity.

The radial component of the particle velocity vector is obtained from the linearized momentum equation in cylindrical coordinates:

$$\rho \frac{\partial u_r}{\partial t} = -\frac{\partial p}{\partial r}. \qquad (26)$$

For time-harmonic fields:

$$u_r(r, \theta) = \frac{i}{\omega \rho} \frac{\partial p}{\partial r}. \qquad (27)$$

With $$\frac{\partial p}{\partial r} = k \frac{\partial p}{\partial kr},$$

substitution of Eq. (21) into Eq. (27) gives:

$$u_{r,tot}(r,\theta)=u_{r,inc}(r,\theta)+u_{r,scat}(r,\theta), \quad (28)$$

where $$u_{r,tot}(r,\theta) = \frac{i}{\rho c} \sum_{m=-\infty}^{\infty} \left[ A_m^{(2)} H_m^{(2)'}(kr) + A_m^{(1)} H_m^{(1)'}(kr) \right] e^{im\theta} \quad (29)$$

$$u_{r,inc}(r,\theta) = \frac{i}{\rho c} \sum_{m=-\infty}^{\infty} i^m J'_m(kr) e^{im(\theta-\theta_{inc})} \quad (30)$$

$$u_{r,scat}(r,\theta) = \frac{i}{\rho c} \sum_{m=-\infty}^{\infty} B_m H_m^{(2)'}(kr) e^{im\theta}. \quad (31)$$

It is known that at the surface of the sensor the total radial particle velocity is either zero (assuming the sensor walls have effectively infinite impedance) or equal to the particle velocity at the opening of the channels given by Eq. (20):

$$u_{r,tot}(R_a,\theta) = \begin{cases} \frac{-iC_n}{\rho c} \sin(kL_n) & \theta_n - \frac{\theta_o}{2} \le \theta \le \theta_n + \frac{\theta_o}{2} \\ 0 & \text{otherwise} \end{cases} \quad (32)$$

This can be expressed more efficiently $$u_{r,tot}(R_a,\theta) = \quad (33)$$
$$\frac{-i}{\rho c} \sum_{n=1}^{N_c} C_n \sin(kL_n)[H(\theta-\theta_n+\theta_o/2) - H(\theta-\theta_n-\theta_o/2)],$$

where H(z) is the Heaviside step function.
Evaluating Eq. (28) at the surface of the sensor $$u_{r,tot}(R_a,\theta) = \quad (34)$$
$$\frac{i}{\rho c} \sum_{m=-\infty}^{\infty} i^m J'_m(kR_a) e^{im(\theta-\theta_{inc})} + \frac{i}{\rho c} \sum_{m=-\infty}^{\infty} B_m H_m^{(2)'}(kR_a) e^{im\theta}.$$

An expression for $B_m$ can be obtained by invoking the orthogonality of the complex exponential Equations (33) and (34) as they are equated, multiplied by $e^{-is\theta}$ and integrated with respect to $\theta$ around the circumference of the sensor. Two integral evaluations are needed.

$$\int_0^{2\pi} e^{i\theta(m-s)} d\theta = \begin{cases} 0 & m \ne s \\ 2\pi & m = s \end{cases} \quad (35)$$

$$\int_0^{2\pi} [H(\theta-\theta_n+\theta_o/2) - H(\theta-\theta_n-\theta_o/2)] e^{-is\theta} d\theta \quad (36)$$

$$= \frac{i}{s} e^{-is\theta_n} [e^{-is\theta_o/2} - e^{is\theta_o/2}]$$

$$= \frac{2}{s} e^{-is\theta_n} \sin\left(\frac{s\theta_o}{2}\right) \quad (37)$$

$$= \theta_o e^{-is\theta_n} \text{sinc}\left(\frac{s\theta_o}{2}\right) \quad (38)$$

where the final result was obtained using the exponential relation for the sine function $$\frac{e^{iz} - e^{-iz}}{2i} = \sin(z). \quad (39)$$

Therefore, an expression for $B_m$ is obtained:

$$B_m = -\frac{\theta_o \text{sinc}\left(\frac{m\theta_o}{2}\right)}{2\pi H_m^{(2)'}(kR_a)} \sum_{n=1}^{N_c} C_n \sin(kL_n) e^{-im\theta_n} - \frac{i^m J'_m(kR_a) e^{-im\theta_{inc}}}{H_m^{(2)'}(kR_a)}. \quad (40)$$

Using relations for the derivatives of the Bessel functions, the expression for the total pressure on the surface of the sensor will now be simplified. The total pressure at the surface of the sensor can be expressed using Eq. (21), substituting in Eqs. (14) and (25):

$$p_{tot}(R_a,\theta) = \sum_{m=-\infty}^{\infty} i^m J_m(kR_a) e^{im(\theta-\theta_{inc})} + \sum_{m=-\infty}^{\infty} B_m H_m^{(2)}(kR_a) e^{im\theta}. \quad (41)$$

Substitution of the expression for $B_m$ given in Eq. (40) gives $$p_{tot}(R_a,\theta) = \quad (42)$$
$$\sum_{m=-\infty}^{\infty} \left[ \frac{J_m(kR_a) H_m^{(2)'}(kR_a) - J'_m(kR_a) H_m^{(2)}(kR_a)}{H_m^{(2)'}(kR_a)} \right] i^m e^{im(\theta-\theta_{inc})} -$$
$$\sum_{m=-\infty}^{\infty} \frac{\theta_o \text{sinc}\left(\frac{m\theta_o}{2}\right) H_m^{(2)}(kR_a)}{2\pi H_m^{(2)'}(kR_a)} \left[ \sum_{n=1}^{N_c} C_n \sin(kL_n) e^{im(\theta-\theta_n)} \right].$$

The bracketed term in the first summation can be simplified as follows. Expanding and simplifying the numerator gives $$J_m(z) H_m^{(2)'}(z) - J'_m(z) H_m^{(2)}(z) = i[J_m'(z) Y_m(z) - J_m(z) Y_m'(z)] \quad (43)$$

Given $$J'_m(z) = \frac{1}{2}[J_{m-1}(z) - J_{m+1}(z)], \quad (44)$$

$$Y'_m(z) = \frac{1}{2}[Y_{m-1}(z) - Y_{m+1}(z)], \text{ and} \quad (45)$$

$$J_m(z) = Y_{m+1}(z) - J_{m+1}(z) Y_m(z) = -\frac{2}{\pi z}, \quad (46)$$

Eq. (43) simplifies:

$$J_m(z) H_m^{(2)'}(z) - J'_m(z) H_m^{(2)}(z) = -\frac{2i}{\pi z}. \quad (47)$$

Thus the total pressure at the surface of the sensor is now expressed:

$$P_{tot}(R_a, \theta) = -\frac{2}{\pi k R_a} \sum_{m=-\infty}^{\infty} \left[ \frac{i^{n+1} e^{im(\theta - \theta_{inc})}}{H_m^{(2)'}(kR_a)} \right] - \quad (48)$$

$$\sum_{m=-\infty}^{\infty} \frac{\theta_o \text{sinc}\left(\frac{m\theta_o}{2}\right) H_m^{(2)}(kR_a)}{2\pi H_m^{(2)'}(kR_a)} \left[ \sum_{n=1}^{N_c} C_n \sin(kL_n) e^{im(\theta - \theta_n)} \right].$$

What remains to be determined are the value of the pressure amplitudes $C_n$ in the channels. The total pressure on the surface of the sensor, at the center of each channel opening, will now be used to develop a linear algebraic system where the unknowns are the channel amplitudes $C_n$.

To simplify the mathematical expression for the total pressure on the surface of the sensor, let the following be defined:

$$\Psi(k, R_a, \theta_{inc}, \theta) = -\frac{2}{\pi k R_a} \sum_{m=-\infty}^{\infty} \left[ \frac{i^{n+1} e^{im(\theta - \theta_{inc})}}{H_m^{(2)'}(kR_a)} \right] \quad (49)$$

$$\Delta_n(k, R_a, \theta_o, \theta) = -\sin(kL_n), \sum_{m=-\infty}^{\infty} \frac{\theta_o \text{sinc}\left(\frac{m\theta_o}{2}\right) H_m^{(2)}(kR_a)}{2\pi H_m^{(2)'}(kR_a)} e^{im(\theta - \theta_n)}. \quad (50)$$

Equation (48) is now expressed $$p_{tot}(k, R_a, \theta_o, \theta_{inc}\theta) = \Psi(k, R_a, \theta_{inc}, \theta) + \sum_{n=1}^{N_c} C_n \Delta_n(k, R_a, \theta_o, \theta). \quad (51)$$

At the entrance of the $q^{th}$ channel this expression is equal to pressure at the opening of the channel, obtained from Eq. (19), giving:

$$C_q \cos(kL_q) = \Psi(k, R_a, \theta_{inc}, \theta_q) + \sum_{n=1}^{N_c} C_n \Delta_n(k, R_a, \theta_o, \theta_q). \quad (52)$$

This expression indicates that all the channels are coupled to each other since the pressure at the opening of the $q^{th}$ channel is a function of the pressure in all the other channels. Note that the amplitude in the $q^{th}$ channel appears on both sides of this result. Rearranging gives $$C_q[\cos(kL_q) - \Delta_q(k, R_a, \theta_o, \theta_q)] - \sum_{n=1, n \neq q}^{N_c} C_n \Delta_n(k, R_a, \theta_o, \theta_q) = \quad (53)$$

$$\Psi(k, R_a, \theta_{inc}, \theta_q).$$

Evaluating this expression at the opening of each channel, a linear algebraic system can be constructed. Let $$\Gamma_n(k,R_a,\theta_o,\theta_n) = \cos(k \cdot L_n) - \Delta_n(k,R_a,\theta_o,\theta_n). \quad (54)$$

For four channels in the sensor:

$$[A] = \begin{bmatrix} \Gamma_1(k, R_a, \theta_o, \theta_1) & -\Delta_2(k, R_a, \theta_o, \theta_1) & -\Delta_3(k, R_a, \theta_o, \theta_1) & -\Delta_4(k, R_a, \theta_o, \theta_1) \\ -\Delta_1(k, R_a, \theta_o, \theta_2) & \Gamma_2(k, R_a, \theta_o, \theta_2) & -\Delta_3(k, R_a, \theta_o, \theta_2) & -\Delta_4(k, R_a, \theta_o, \theta_2) \\ -\Delta_1(k, R_a, \theta_o, \theta_3) & -\Delta_2(k, R_a, \theta_o, \theta_3) & \Gamma_3(k, R_a, \theta_o, \theta_3) & -\Delta_4(k, R_a, \theta_o, \theta_3) \\ -\Delta_1(k, R_a, \theta_o, \theta_4) & -\Delta_2(k, R_a, \theta_o, \theta_4) & -\Delta_3(k, R_a, \theta_o, \theta_4) & \Gamma_4(k, R_a, \theta_o, \theta_4) \end{bmatrix} \quad (56)$$

$$\{b\} = \begin{Bmatrix} \Psi(k, R_a, \theta_{inc}, \theta_1) \\ \Psi(k, R_a, \theta_{inc}, \theta_2) \\ \Psi(k, R_a, \theta_{inc}, \theta_3) \\ \Psi(k, R_a, \theta_{inc}, \theta_4) \end{Bmatrix}.$$

The linear algebraic system is then:

$$[A]\{C\} = \{b\} \quad (57)$$

For each incidence angle this is solved for the amplitudes $C_n$ detected in each channel.

Figure 3:
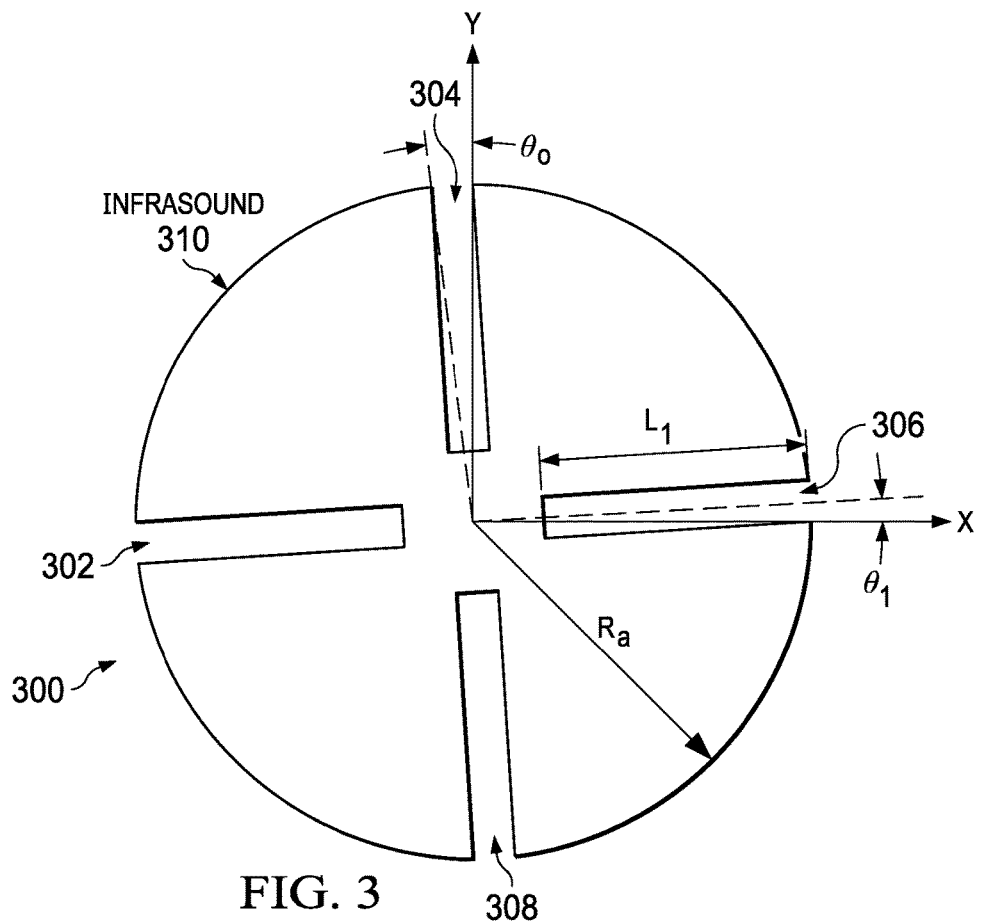
FIG. 3 is an illustration of a cross-section view of a directional infrasound sensor in accordance with an illustrative embodiment.

Turning to FIG. 3, an illustration of a cross-section view of a directional infrasound sensor is depicted in accordance with an illustrative embodiment. Directional infrasound sensor 300 is an example of one implementation of directional infrasound sensor 202 in FIG. 2.

Directional infrasound sensor 300 includes four channels 302, 304, 306, and 308 with openings pointing in four different directions. In this example, all four channels 302, 304, 306, and 308 are straight and have the same length.

As discussed above, sensor devices (not shown in FIG. 3) are positioned at the closed ends of channels 302, 304, 306, and 308. Sensor signals from the sensor devices in channels 302, 304, 306, and 308 are used to determine the direction of arrival of infrasound 310 at directional infrasound sensor 300.

Figure 4:
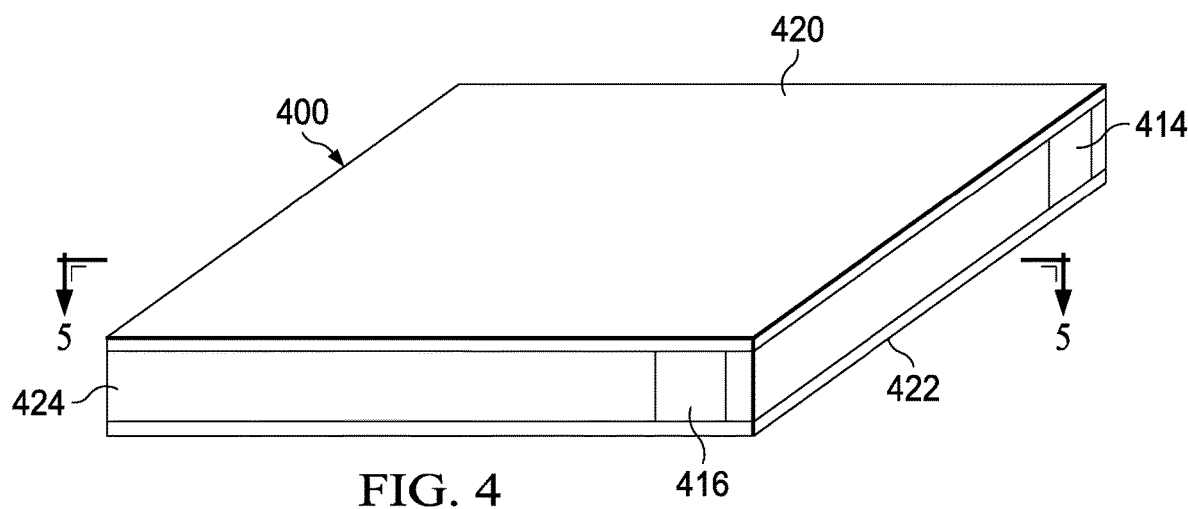
FIG. 4 is an illustration of a perspective view of another embodiment of a directional infrasound sensor in accordance with an illustrative embodiment.
Figure 5:
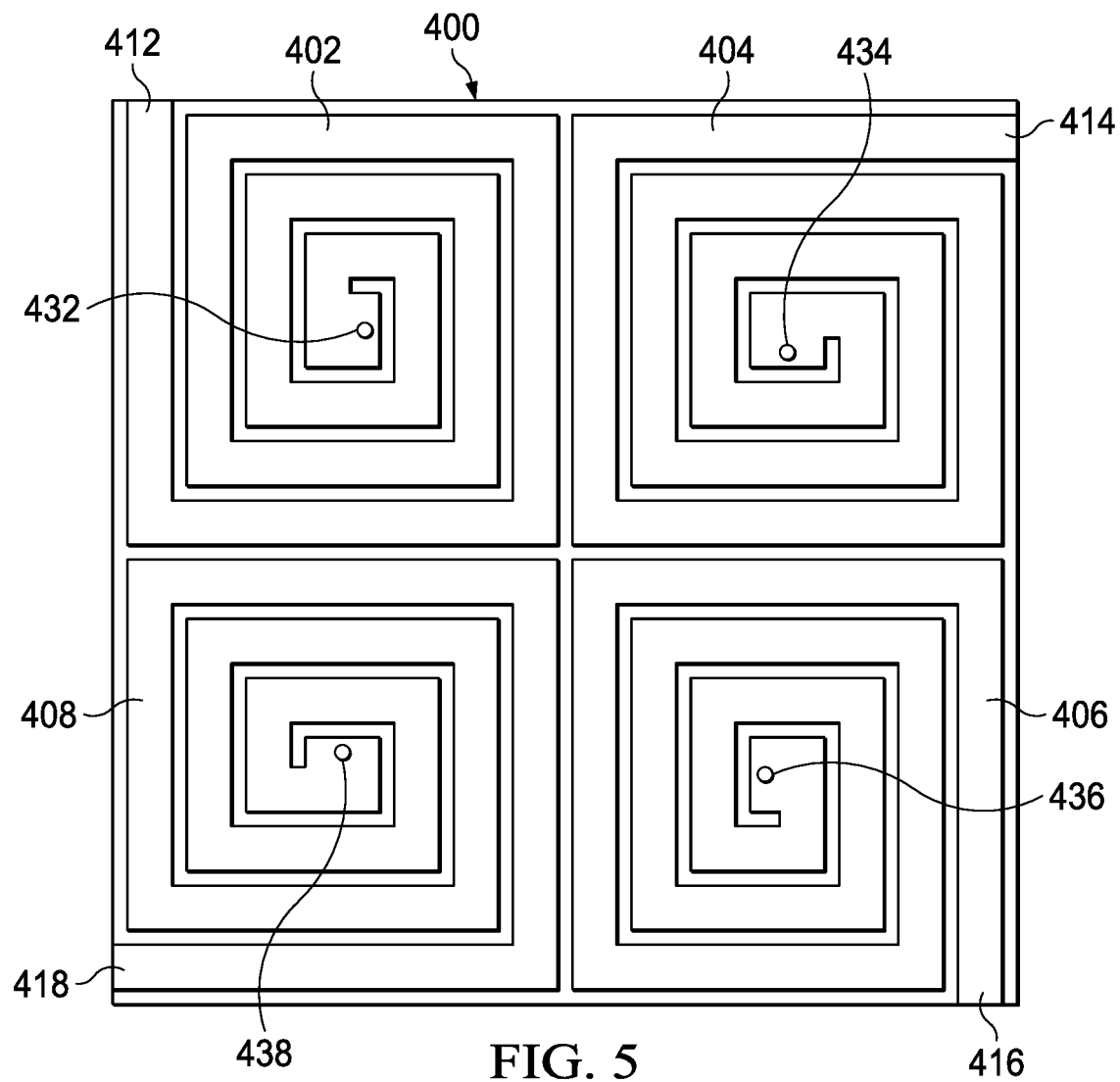
FIG. 5 is an illustration of a cross-section view of the directional infrasound sensor in accordance with an illustrative embodiment of FIG. 4, as taken along line 5-5 of FIG. 4.

Turning to FIG. 4, an illustration of a perspective view of another embodiment of a directional infrasound sensor is depicted in accordance with an illustrative embodiment. FIG. 5 is an illustration of a cross-section view of directional infrasound sensor 400 in accordance with an illustrative embodiment of FIG. 4, as taken along line 5-5 of FIG. 4. Directional infrasound sensor 400 is an example of another implementation of directional infrasound sensor 202 in FIG. 2.

Directional infrasound sensor 400 includes four channels 402, 404, 406, and 408 with corresponding openings 412, 414, 416, and 418 pointing in four different directions. In this example, all four channels 402, 404, 406, and 408 are coil shaped and have the same length.

In this example, top and bottom walls defining channels 402, 404, 406, and 408 are formed by metal plates 420 and 422, respectively. Side walls defining channels 402, 404, 406, and 408 are formed by concrete blocks 424.

Sensor devices 432, 434, 436, and 438 are positioned at the closed ends of channels 402, 404, 406, and 408, respectively. Sensor signals from sensor devices 432, 434, 436, and 438 in channels 402, 404, 406, and 408 may be used to determine the direction of arrival of infrasound at directional infrasound sensor 400.

Figure 6:
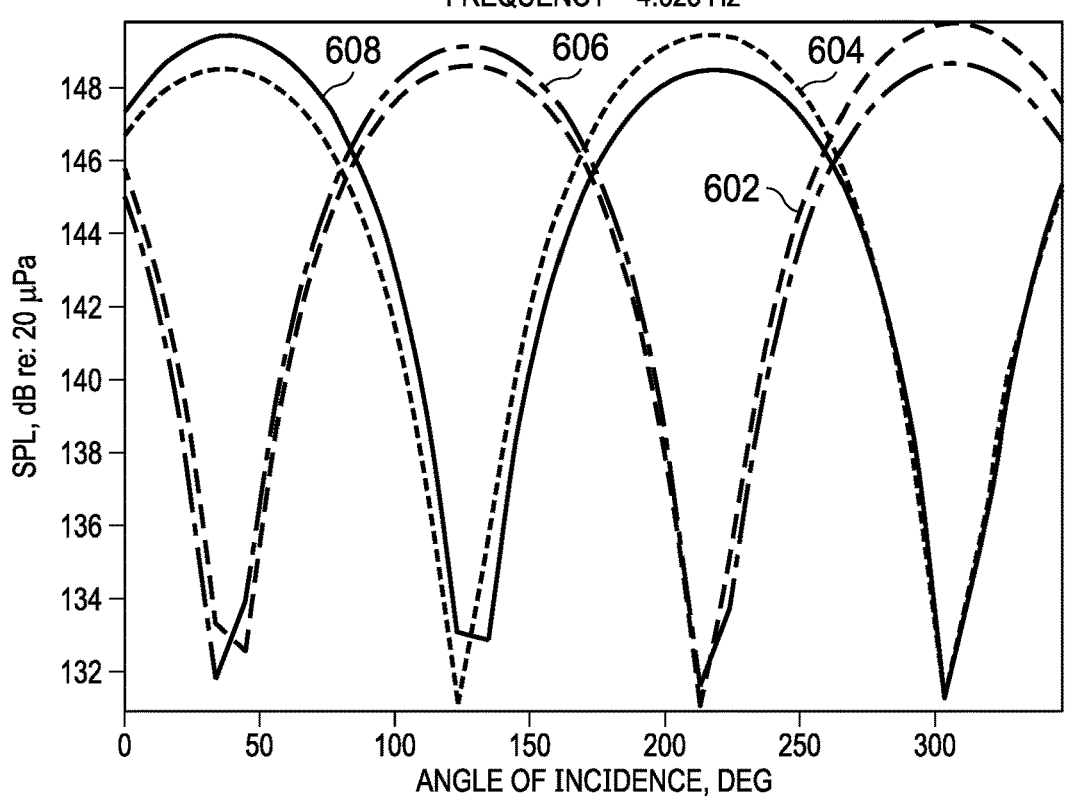
FIGS. 6 and 7 are diagrams illustrating simulated directionality of sensing of the directional infrasound sensor in accordance with an illustrative embodiment of FIG. 4.
Figure 7:
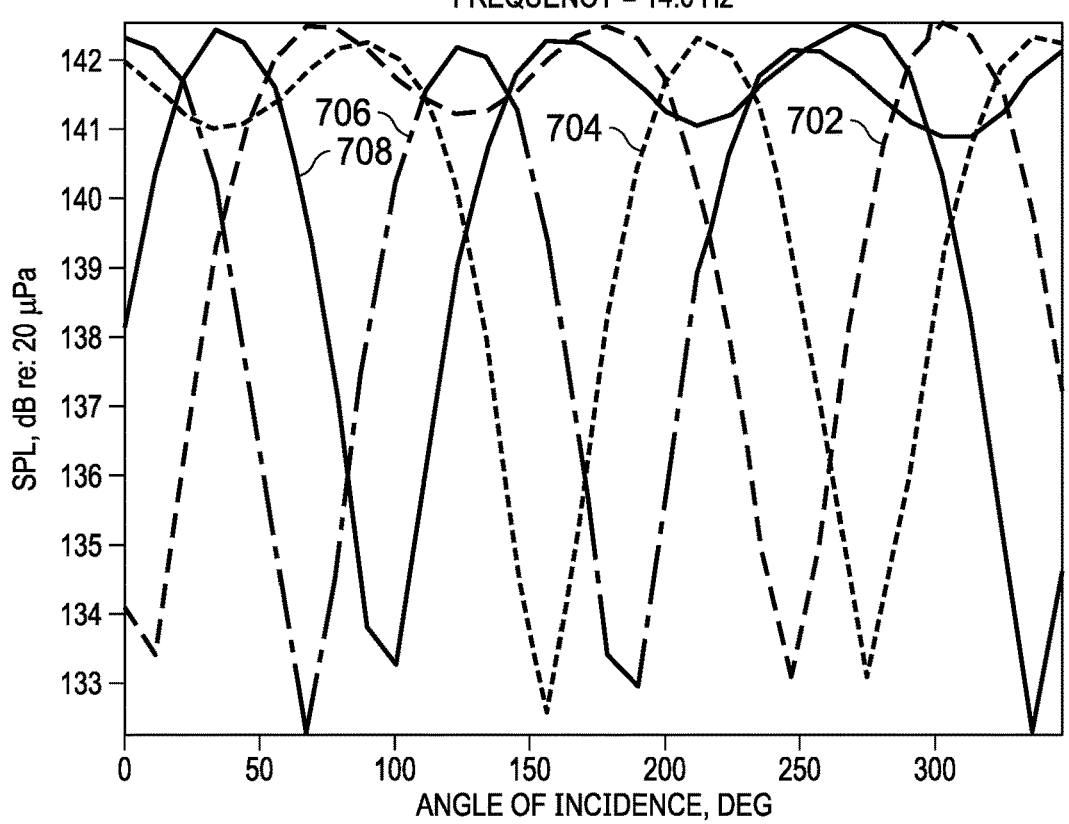

Turning to FIGS. 6 and 7, diagrams illustrating simulated directionality of sensing of directional infrasound sensor 400 in accordance with an illustrative embodiment of FIG. 4 are presented.

FIG. 6 shows sound pressure levels detected by sensor devices 432, 434, 436, and 438 in infrasound sensor 400 in response to infrasound at 4.625 Hz. Line 602 shows the sound pressure level detected by sensor 432 in channel 402 relative to the direction of arrival of the infrasound. Line 604 shows the sound pressure level detected by sensor 434 in channel 404 relative to the direction of arrival of the infrasound. Line 606 shows the sound pressure level detected by sensor 436 in channel 406 relative to the direction of arrival of the infrasound. Line 608 shows the sound pressure level detected by sensor 438 in channel 408 relative to the direction of arrival of the infrasound.

FIG. 7 shows sound pressure levels detected by sensor devices 432, 434, 436, and 438 in infrasound sensor 400 in response to infrasound at 14.0 Hz. Line 702 shows the sound pressure level detected by sensor 432 in channel 402 relative to the direction of arrival of the infrasound. Line 704 shows the sound pressure level detected by sensor 434 in channel 404 relative to the direction of arrival of the infrasound. Line 706 shows the sound pressure level detected by sensor 436 in channel 406 relative to the direction of arrival of the infrasound. Line 708 shows the sound pressure level detected by sensor 438 in channel 408 relative to the direction of arrival of the infrasound.

FIGS. 6 and 7 show that the relative levels of detection of infrasound by sensor devices 432, 434, 436, and 438 in infrasound sensor 400 are unique for each different direction of arrival of the infrasound. Therefore, the relative levels of detection of infrasound by sensor devices 432, 434, 436, and 438 in infrasound sensor 400 can be used to determine the direction of arrival of infrasound at infrasound sensor 400.

Figure 8:
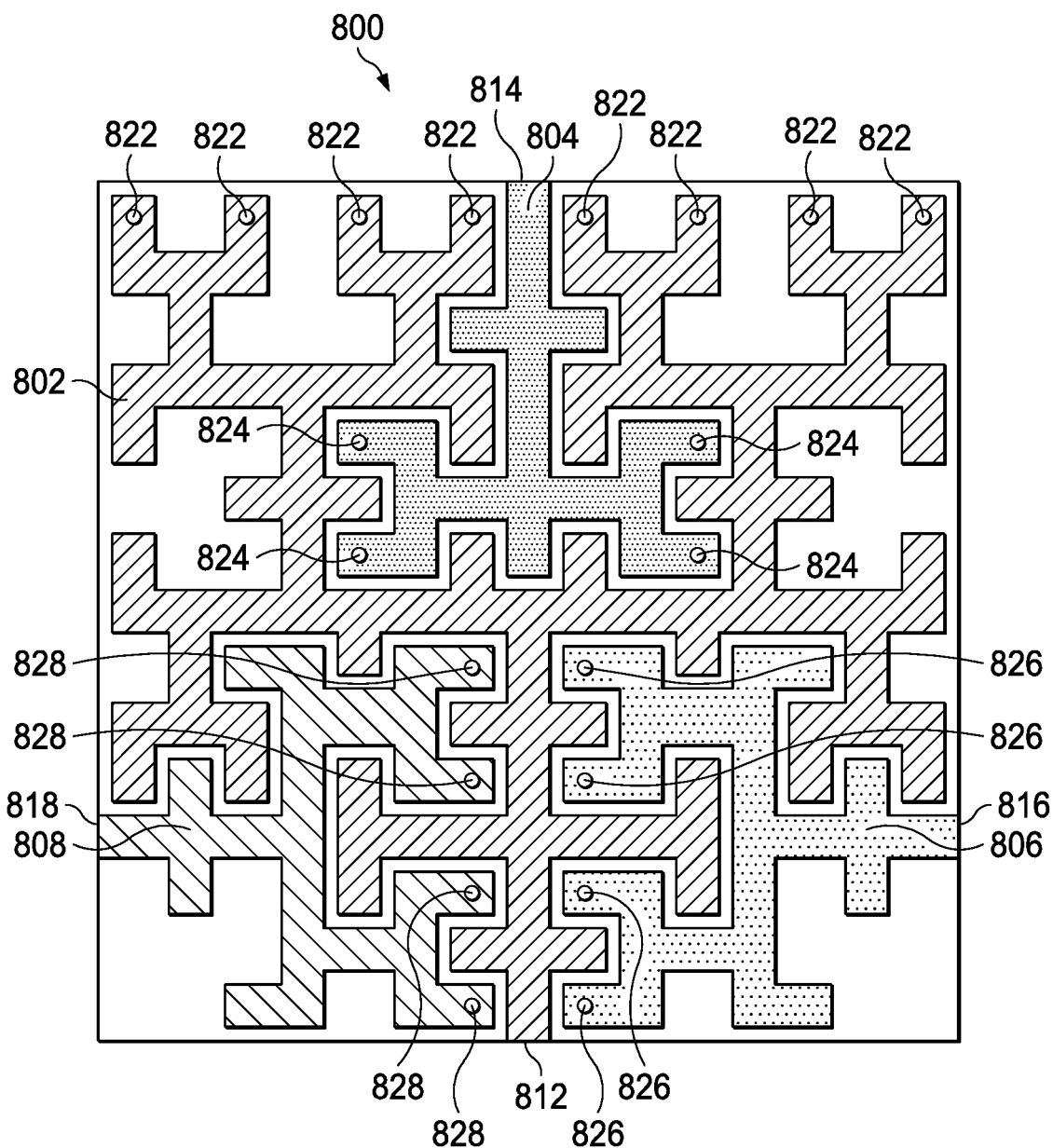
FIG. 8 is an illustration of a cross-section view of another embodiment of a directional infrasound sensor in accordance with an illustrative embodiment.

Turning to FIG. 8, an illustration of a cross-section view of another embodiment of a directional infrasound sensor is depicted in accordance with an illustrative embodiment. Directional infrasound sensor 800 is an example of another implementation of directional infrasound sensor 202 in FIG. 2.

Directional infrasound sensor 800 includes four channels 802, 804, 806, and 808 with corresponding openings 812, 814, 816, and 818 pointing in four different directions. In this example, channels 802, 804, 806, and 808 have various different shapes and lengths and numbers of closed ends.

Sensor devices 822, 824, 826, and 828 are positioned at the closed ends of channels 802, 804, 806, and 808, respectively. Sensor signals from sensor devices 822, 824, 826, and 828 in channels 802, 804, 806, and 808 may be used to determine the direction of arrival of infrasound at directional infrasound sensor 400.

Figure 9:
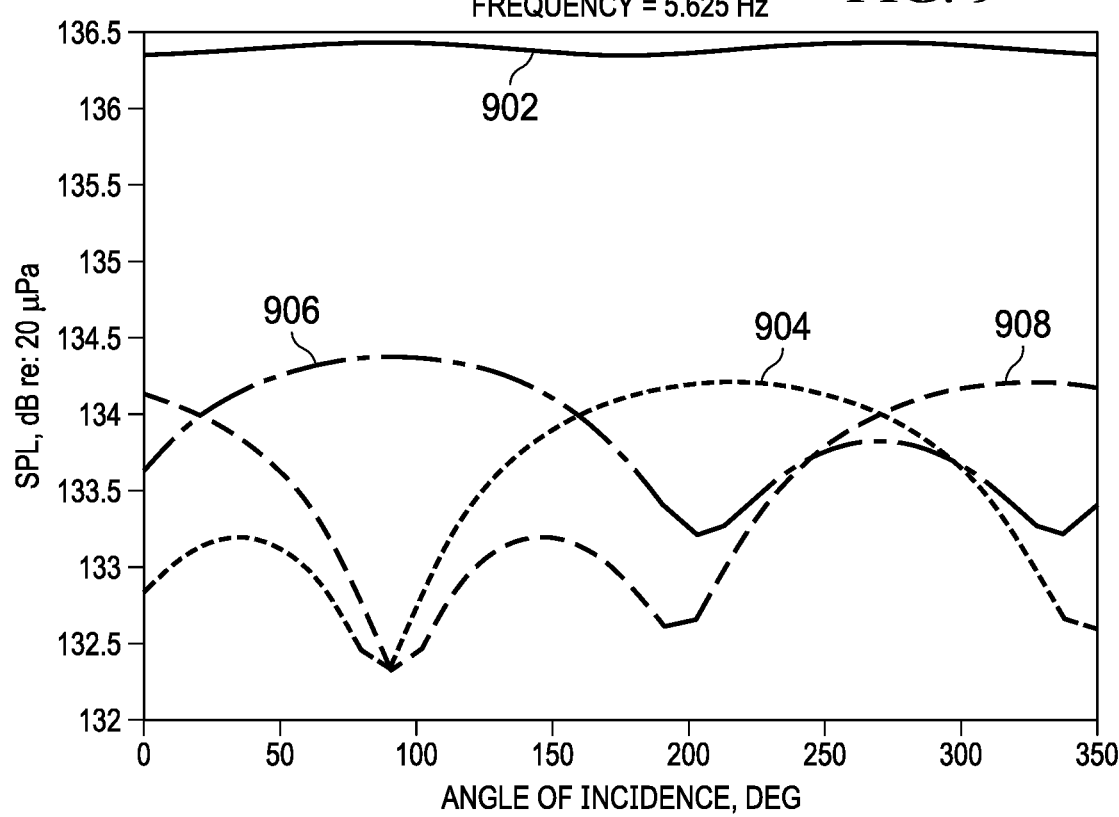
FIG. 9 is a diagram illustrating simulated directionality of sensing of the directional infrasound sensor in accordance with an illustrative embodiment of FIG. 8.

Turning to FIG. 9, a diagram illustrating simulated directionality of sensing of directional infrasound sensor 800 in accordance with an illustrative embodiment of FIG. 8 is presented. FIG. 9 shows sound pressure levels detected by sensor devices 822, 824, 826, and 828 in infrasound sensor 800 in response to infrasound at 5.625 Hz. Line 902 shows the sound pressure level detected by sensor 822 in channel 802 relative to the direction of arrival of the infrasound. Line 904 shows the sound pressure level detected by sensor 824 in channel 804 relative to the direction of arrival of the infrasound. Line 906 shows the sound pressure level detected by sensor 826 in channel 806 relative to the direction of arrival of the infrasound. Line 808 shows the sound pressure level detected by sensor 828 in channel 808 relative to the direction of arrival of the infrasound.

FIG. 9 shows that the relative levels of detection of infrasound by sensor devices 822, 824, 826, and 828 in infrasound sensor 800 are unique for each different direction of arrival of the infrasound. Therefore, the relative levels of detection of infrasound by sensor devices 822, 824, 826, and 828 in infrasound sensor 800 can be used to determine the direction of arrival of infrasound at infrasound sensor 800.

Figure 10:
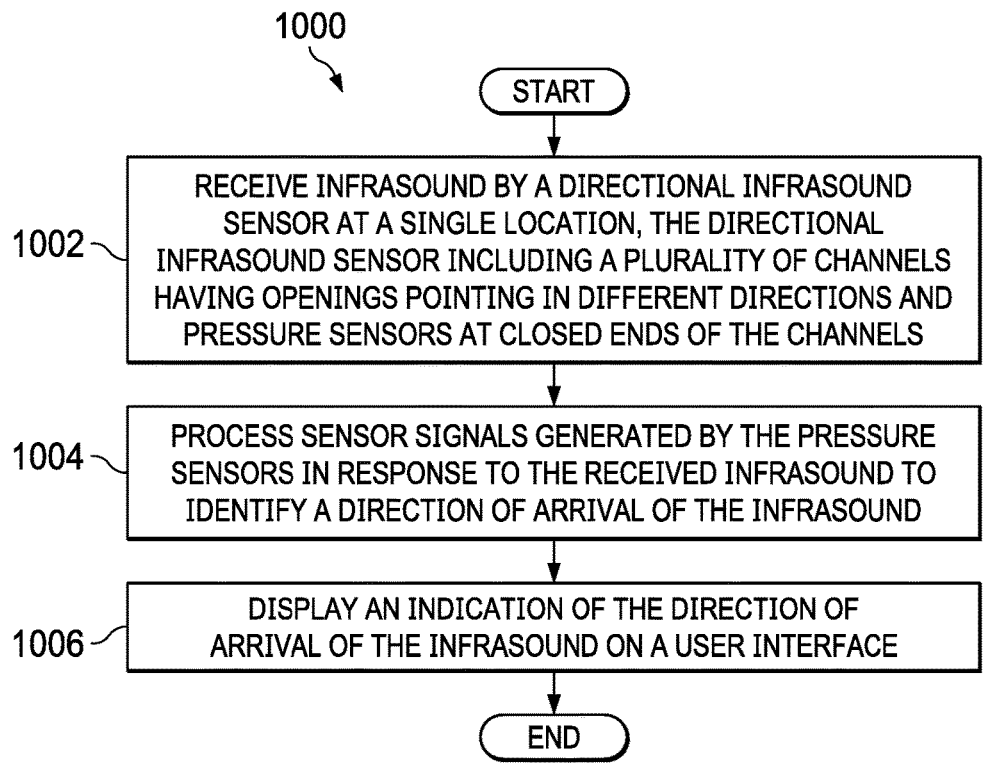
FIG. 10 is an illustration of a flowchart of a process for directional sensing of infrasound in accordance with an illustrative embodiment.

Turning to FIG. 10, an illustration of a flowchart of a process for directional sensing of infrasound is depicted in accordance with an illustrative embodiment. Process 1000 may be implemented, for example, in directional infrasound sensing system 200 in FIG. 2.

Process 1000 begins with receiving infrasound by a directional infrasound sensor at a single location, the directional infrasound sensor including a plurality of channels having openings pointing in different directions and pressure sensors at closed ends of the channels (operation 1002). Sensor signals generated by the pressure sensors in response to the received infrasound are processed to identify a direction of arrival of the infrasound (operation 1004). An indication of the direction of arrival of the infrasound then may be displayed on a user interface (operation 1006), with the process terminating thereafter.

Figure 11:
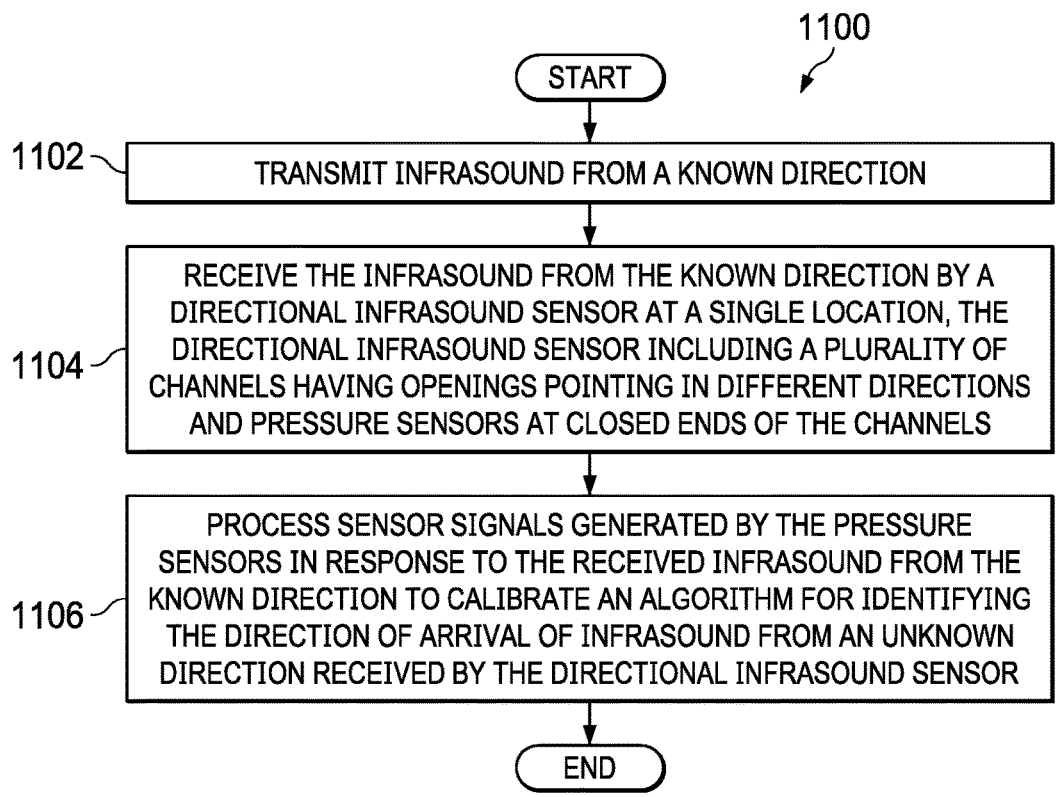
FIG. 11 is an illustration of a flowchart of a process for calibrating a directional infrasound sensor system in accordance with an illustrative embodiment.

Turning to FIG. 11, an illustration of a flowchart of a process for calibrating a directional infrasound sensor system is depicted in accordance with an illustrative embodiment. Process 1100 may be implemented, for example, in directional infrasound sensing system 200 in FIG. 2.

Process 1100 begins with transmitting infrasound from a known direction (operation 1102). The infrasound from the known direction is received by a directional infrasound sensor at a single location, the directional infrasound sensor including a plurality of channels having openings pointing in different directions and pressure sensors at closed ends of the channels (operation 1104). Sensor signals generated by the pressure sensors in response to the received infrasound from the known direction are processed to calibrate an algorithm for identifying the direction of arrival of infrasound from an unknown direction received by the directional infrasound sensor (operation 1106), with the process terminating thereafter.

Figure 12:
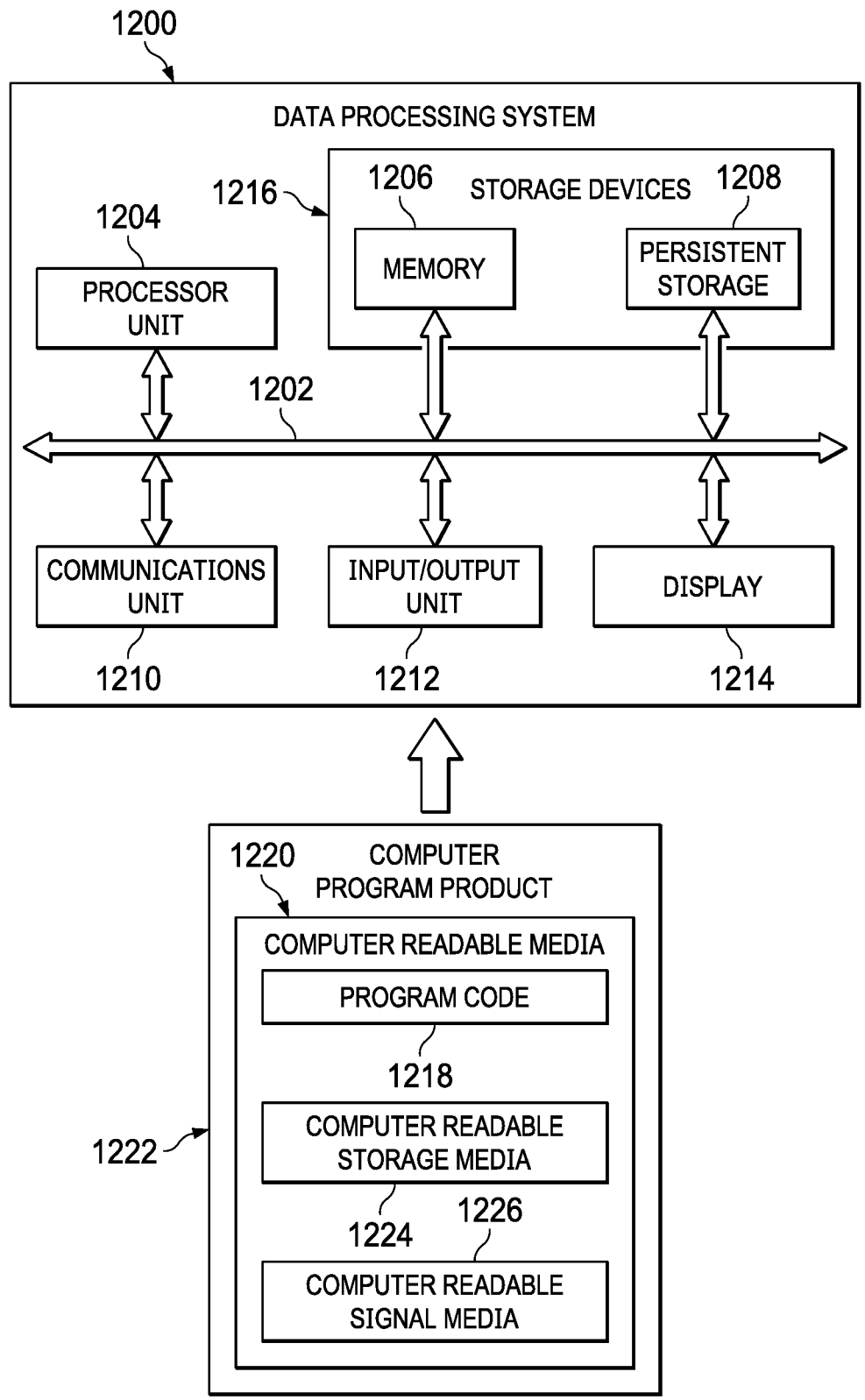
FIG. 12 is an illustration of a block diagram of a data processing system in accordance with an illustrative embodiment.

Turning to FIG. 12, an illustration of a block diagram of a data processing system is depicted in accordance with an illustrative embodiment. Data processing system 1200 is an example of one possible implementation of computer 246 in which signal processing system 204 for directional infrasound sensing system 200 in FIG. 2 is implemented.

In this illustrative example, data processing system 1200 includes communications fabric 1202. Communications fabric 1202 provides communications between processor unit 1204, memory 1206, persistent storage 1208, communications unit 1210, input/output (I/O) unit 1212, and display 1214. Memory 1206, persistent storage 1208, communications unit 1210, input/output (I/O) unit 1212, and display 1214 are examples of resources accessible by processor unit 1204 via communications fabric 1202.

Processor unit 1204 serves to run instructions for software that may be loaded into memory 1206. Processor unit 1204 may be a number of processors, a multi-processor core, or some other type of processor, depending on the particular implementation. Further, processor unit 1204 may be implemented using a number of heterogeneous processor systems in which a main processor is present with secondary processors on a single chip. As another illustrative example, processor unit 1204 may be a symmetric multi-processor system containing multiple processors of the same type.

Memory 1206 and persistent storage 1208 are examples of storage devices 1216. A storage device is any piece of hardware that is capable of storing information, such as, for example, without limitation, data, program code in functional form, and other suitable information either on a temporary basis or a permanent basis. Storage devices 1216 also may be referred to as computer readable storage devices in these examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these examples, provides for communications with other data processing systems or devices. Communications unit 1210 may provide communications through the use of either or both physical and wireless communications links.

Input/output (I/O) unit 1212 allows for input and output of data with other devices that may be connected to data processing system 1200. For example, input/output (I/O) unit 1212 may provide a connection for user input through a keyboard, a mouse, and/or some other suitable input device. Further, input/output (I/O) unit 1212 may send output to a printer. Display 1214 provides a mechanism to display information to a user.

Instructions for the operating system, applications, and/or programs may be located in storage devices 1216, which are in communication with processor unit 1204 through communications fabric 1202. In these illustrative examples, the instructions are in a functional form on persistent storage 1208. These instructions may be loaded into memory 1206 for execution by processor unit 1204. The processes of the different embodiments may be performed by processor unit 1204 using computer-implemented instructions, which may be located in a memory, such as memory 1206.

These instructions are referred to as program instructions, program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these examples. In one example, computer readable media 1220 may be computer readable storage media 1224 or computer readable signal media 1226.

Computer readable storage media 1224 may include, for example, an optical or magnetic disk that is inserted or placed into a drive or other device that is part of persistent storage 1208 for transfer onto a storage device, such as a hard drive, that is part of persistent storage 1208. Computer readable storage media 1224 also may take the form of a persistent storage, such as a hard drive, a thumb drive, or a flash memory, that is connected to data processing system 1200. In some instances, computer readable storage media 1224 may not be removable from data processing system 1200.

In these examples, computer readable storage media 1224 is a physical or tangible storage device used to store program code 1218, rather than a medium that propagates or transmits program code 1218. Computer readable storage media 1224 is also referred to as a computer readable tangible storage device or a computer readable physical storage device. In other words, computer readable storage media 1224 is a media that can be touched by a person.

Alternatively, program code 1218 may be transferred to data processing system 1200 using computer readable signal media 1226. Computer readable signal media 1226 may be, for example, a propagated data signal containing program code 1218. For example, computer readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1218 may be downloaded over a network to persistent storage 1208 from another device or data processing system through computer readable signal media 1226 for use within data processing system 1200. For instance, program code stored in a computer readable storage media 1224 in a server data processing system may be downloaded over a network from the server to data processing system 1200. The data processing system providing program code 1218 may be a server computer, a client computer, or some other device capable of storing and transmitting program code 1218.

The different components illustrated for data processing system 1200 are not meant to provide architectural limitations to the manner in which different embodiments may be implemented. The different illustrative embodiments may be implemented in a data processing system including components in addition to and/or in place of those illustrated for data processing system 1200. Other components shown in FIG. 12 can be varied from the illustrative examples shown. The different embodiments may be implemented using any hardware device or system capable of running program code. As one example, data processing system 1200 may include organic components integrated with inorganic components and/or may be comprised entirely of organic components excluding a human being. For example, a storage device may be comprised of an organic semiconductor.

In another illustrative example, processor unit 1204 may take the form of a hardware unit that has circuits that are manufactured or configured for a particular use. This type of hardware may perform operations without needing program code to be loaded into a memory from a storage device to be configured to perform the operations.

For example, when processor unit 1204 takes the form of a hardware unit, processor unit 1204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1218 may be omitted, because the processes for the different embodiments are implemented in a hardware unit.

In still another illustrative example, processor unit 1204 may be implemented using a combination of processors found in computers and hardware units. Processor unit 1204 may have a number of hardware units and a number of processors that are configured to run program code 1218. With this depicted example, some of the processes may be implemented in the number of hardware units, while other processes may be implemented in the number of processors.

In another example, a bus system may be used to implement communications fabric 1202 and may be comprised of one or more buses, such as a system bus or an input/output bus. Of course, the bus system may be implemented using any suitable type of architecture that provides for a transfer of data between different components or devices attached to the bus system.

Additionally, communications unit 1210 may include a number of devices that transmit data, receive data, or both transmit and receive data. Communications unit 1210 may be, for example, a modem or a network adapter, two network adapters, or some combination thereof. Further, a memory may be, for example, memory 1206, or a cache, such as that found in an interface and memory controller hub that may be present in communications fabric 1202.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A directional infrasound sensor, comprising:
   a plurality of channels, wherein each channel in the plurality of channels comprises a single opening at a first end of the channel and a closed end opposite the opening, wherein the opening of each channel in the plurality of channels is pointed in a different direction from the opening of each other channel in the plurality of channels;
   a plurality of sensor devices comprising a sensor device at the closed end of each channel in the plurality of channels, wherein each sensor device in the plurality of sensor devices is configured to generate a sensor signal in response to pressure; and
   a signal processing system configured to process the sensor signals generated by the plurality of sensor devices to determine a direction of infrasound received by the directional infrasound sensor.

2. The directional infrasound sensor of claim 1, wherein air in the plurality of channels resonates in response to infrasound received by the directional infrasound sensor.

3. The directional infrasound sensor of claim 2, wherein a shape of each channel in the plurality of channels is a fractal.

4. The directional infrasound sensor of claim 1, wherein a shape of each channel in the plurality of channels is a fractal.

5. The directional infrasound sensor of claim 1, wherein a shape of each channel in the plurality of channels along a length of the channel between the opening and the closed end of the channel is selected from straight and a coil shape.

6. The directional infrasound sensor of claim 1, wherein a length of each channel in the plurality of channels between the opening and the closed end of the channel is substantially the same as the length of each other channel in the plurality of channels.

7. The directional infrasound sensor of claim 1, wherein a length of each channel in the plurality of channels between the opening and the closed end of the channel is different from the length of each other channel in the plurality of channels.

8. The directional infrasound sensor of claim 1, wherein:
   a first opening of a first channel in the plurality of channels points in a first direction;
   a second opening of a second channel in the plurality of channels points in a second direction, wherein the second direction is opposite to the first direction;
   a third opening of a third channel in the plurality of channels points in a third direction, wherein the third direction is perpendicular to the first direction and to the second direction; and
   a fourth opening of a fourth channel in the plurality of channels points in a fourth direction, wherein the fourth direction is opposite to the third direction.

9. The directional infrasound sensor of claim 1, wherein each channel in the plurality of channels is defined by walls made from a material selected from a group of materials consisting of concrete and metal.

10. The directional infrasound sensor of claim 1, wherein each sensor device in the plurality of sensor devices comprises a pressure sensor.

11. A directional infrasound sensor, comprising:
    a first directional infrasound sensor comprising a first plurality of channels, wherein each channel in the first plurality of channels comprises a single opening at a first end of the channel and a closed end opposite the opening, wherein the opening of each channel in the first plurality of channels is pointed in a different direction from the opening of each other channel in the first plurality of channels, and a first plurality of sensor devices comprising a sensor device at the closed end of each channel in the first plurality of channels, wherein each sensor device in the first plurality of sensor devices is configured to generate a sensor signal in response to pressure; and
    a second directional infrasound sensor stacked one on top of another at a single location with the first directional infrasound sensor, wherein the second directional infrasound sensor comprises a second plurality of channels, wherein the second plurality of channels are different from the first plurality of channels, wherein each channel in the second plurality of channels comprises a single opening at a first end of the channel and a closed end opposite the opening, wherein the opening of each channel in the second plurality of channels is pointed in a different direction from the opening of each other channel in the second plurality of channels, and a second plurality of sensor devices comprising a sensor device at the closed end of each channel in the second plurality of channels, wherein each sensor device in the second plurality of sensor devices is configured to generate a sensor signal in response to pressure.

12. A method of determining a direction of infrasound, comprising:
receiving the infrasound by a directional infrasound sensor comprising a plurality of channels, wherein each channel in the plurality of channels comprises a single opening at a first end of the channel and a closed end opposite the opening, wherein the opening of each channel in the plurality of channels is pointed in a different direction from the opening of each other channel in the plurality of channels, and a plurality of sensor devices comprising a sensor device at the closed end of each channel in the plurality of channels, wherein each sensor device in the plurality of sensor devices is configured to generate a sensor signal in response to pressure;
processing the sensor signals generated by the plurality of sensor devices using an algorithm to determine the direction of the infrasound received by the directional infrasound sensor;
receiving other infrasound from a known direction by the directional infrasound sensor; and
processing the sensor signals generated by the plurality of sensor devices in response to receiving the other infrasound by the directional infrasound sensor to calibrate the algorithm.

13. The method of claim 12, wherein air in the plurality of channels resonates in response to the infrasound received by the directional infrasound sensor.

14. The method of claim 13, wherein a shape of each channel in the plurality of channels is a fractal.

15. The method of claim 12, wherein a shape of each channel in the plurality of channels is a fractal.

16. The method of claim 12, wherein a shape of each channel in the plurality of channels along a length of the channel between the opening and the closed end of the channel is selected from straight and a coil shape.

17. The method of claim 12, wherein a length of each channel in the plurality of channels between the opening and the closed end of the channel is different from the length of each other channel in the plurality of channels.

18. The method of claim 12, wherein:
a first opening of a first channel in the plurality of channels points in a first direction;
a second opening of a second channel in the plurality of channels points in a second direction, wherein the second direction is opposite to the first direction;
a third opening of a third channel in the plurality of channels points in a third direction, wherein the third direction is perpendicular to the first direction and to the second direction; and
a fourth opening of a fourth channel in the plurality of channels points in a fourth direction, wherein the fourth direction is opposite to the third direction.

19. The method of claim 12, wherein each channel in the plurality of channels is defined by walls made from a material selected from a group of materials consisting of concrete and metal.

20. The method of claim 12, wherein each sensor device in the plurality of sensor devices comprises a pressure sensor.

* * * * *